United States Patent [19]

Davis et al.

[11] Patent Number: 5,011,670
[45] Date of Patent: Apr. 30, 1991

[54] INTEGRATED REFORMER PROCESS FOR THE PRODUCTION OF CARBON BLACK

[75] Inventors: Ruth A. Davis, Allentown; David M. Nicholas, New Tripoli; Dale D. Smith; Shoou-I Wang, both of Allentown; Richard A. Wright, Macungie, all of Pa.

[73] Assignee: Air Products and Chemicals, Inc., Allentown, Pa.

[21] Appl. No.: 320,206

[22] Filed: Mar. 7, 1989

[51] Int. Cl.$^5$ .................... C01B 31/62; C09C 1/48
[52] U.S. Cl. .................... 423/450; 423/445; 423/449; 423/458; 106/492
[58] Field of Search .............. 423/445, 449, 450, 458, 423/562; 106/492

[56] References Cited

U.S. PATENT DOCUMENTS

| | | | |
|---|---|---|---|
| 1,902,797 | 3/1933 | Burke | 423/458 |
| 2,015,360 | 9/1935 | Eagles | 423/458 |
| 2,062,358 | 12/1936 | Frolich | 423/458 |
| 2,173,695 | 9/1939 | Reed | 423/450 |
| 2,694,621 | 11/1954 | Steinschlaeger | 423/450 |
| 2,702,782 | 2/1955 | Little | 423/450 |
| 3,172,729 | 3/1965 | Galocsy et al. | 423/458 |
| 3,232,728 | 2/1966 | Reynolds | 423/430 |
| 3,810,975 | 5/1974 | Brooke | 423/652 |
| 3,988,425 | 10/1976 | Jockel et al. | 423/652 |
| 4,185,083 | 1/1980 | Walker | 423/445 |
| 4,261,964 | 4/1981 | Scott, IV et al. | 423/450 |
| 4,393,034 | 7/1983 | Smith | 423/450 |
| 4,460,558 | 7/1984 | Johnson | 423/450 |
| 4,490,346 | 12/1984 | Cheng | 423/456 |

Primary Examiner—Robert Kunemund
Attorney, Agent, or Firm—Geoffrey L. Chase; James C. Simmons; William F. Marsh

[57] ABSTRACT

Carbon black is produced from a pyrolyzed hydrocarbon wherein pyrolysis is effected by combusting a synthesis gas containing hydrogen and carbon monoxide. The synthesis gas is produced from reforming a hydrocarbon fuel, wherein the reformation is heated by combusting carbon black effluent tail gas or indirect heat exchange of the hot tail gas.

2 Claims, 2 Drawing Sheets

INTEGRATED REFORMER PROCESS FOR THE PRODUCTION OF CARBON BLACK

TECHNICAL FIELD

The present invention is directed to the field of carbon black production using hydrogen and carbon monoxide containing synthesis gas to provide heat for the carbon black formation. More specifically, the heat and/or fuel value of the tail gas from carbon black production is utilized to convert methane fuel to a synthesis gas used in turn as fuel in the carbon black production process.

BACKGROUND OF THE PRIOR ART

In the manufacture of carbon black, natural gas is combusted with a stoichiometric excess of oxidant, typically air, to provide a hot combustion gas. Oil feedstock is sprayed into the hot gas causing it to pyrolyze into elemental carbon product. This product is carried in the reactor tail gas through various quench steps and heat recovery before it is separated in a filter device. Residual, low pressure tail gas from the filters contains large quantities of nitrogen, water, carbon dioxide, hydrogen and carbon monoxide yielding a low BTU(50-150 British Thermal Unit/standard cubic foot BTU/SCF) fuel. Some tail gas is used to fuel carbon dryer furnaces and boilers, but excess gas is incinerated.

Effective utilization of the low BTU excess tail gas can result in an overall energy efficiency improvement for the carbon black process. Efficiency improvements can also result from effectively integrating waste heat recovery into the carbon black process and limiting quench requirements. Increased efficiency can translate into reduced natural gas requirements or increased carbon black production.

Better utilization of carbon black reactor tail gas has been proposed by several patents in the prior art.

In U.S. Pat. No. 4,261,964, Scott, IV et al. proposed extracting the combustible components (hydrogen and/or carbon monoxide) from the tail gas and replacing 33% to 100% of the natural gas fuel with these components. The method for CO extraction described was a liquid adsorbent process known as COSORB. Hydrogen was recovered from the resultant CO—free tail gas with a cryogenic process.

There are several disadvantages to this process. The solvent CO absorption process (COSORB) is very sensitive to oxygen and water content in the tail gas. Water must be removed from the tail gas with dryers; failure to remove water results in severe corrosion problems in the COSORB equipment due to HCl formation. Oxygen will result in solid precipitates that foul and plug equipment.

The low pressure tail gas (near atmospheric) will require a large absorber column and high solvent circulation rates due to low separation driving force for CO removal. The COSORB solvent requires about 100,000-150,000 BTU/lb mole CO for regeneration. The combination of high energy requirements and high capital makes this recovery method uneconomical.

U.S. Pat. Nos. 4,460,558 and 4,393,034 utilize oxygen enriched air for the carbon black reactor oxidant gas. This minimizes the nitrogen content of the tail gas, upgrading its heating value, and making it suitable for reactor fuel.

Oxygen enrichment also has several disadvantages especially when retrofitting an existing carbon black process. Oxygen enrichment increases combustion chamber temperatures and requires a refractory changeout or the advantages of oxygen enrichment are limited. Oxygen is costly—its cost is about equivalent to the natural gas fuel cost that is replaced. Equipment must be installed to cool and condense water from the tail gas to improve its heating value. The integrated SMR process can retrofit existing carbon black processes without requiring equipment changeout in the carbon black process.

Chen cites in U.S. Pat. No. 4,490,346 a method for using the low BTU content tail gas by combusting with with near stoichiometric amounts of air and then tempering the combustion mixture with diluent tail gas or air before oil injection. A special compact reactor configuration with means for diluent introduction is needed to carry out this process.

The disadvantages of the prior art set forth above have been overcome by the present invention which will be described in greater detail below.

BRIEF SUMMARY OF THE INVENTION

The present invention is a process for the production of carbon black from a hydrocarbon feedstock comprising: reforming a hydrocarbon fuel into a predominantly hydrogen and carbon monoxide containing synthesis gas with steam in a catalytic elevated temperature reformation reaction, pyrolyzing said hydrocarbon feedstock to produce a carbon black containing tail gas wherein the heat of the pyrolysis is provided by the combustion of said synthesis gas, quenching the tail gas and recovering the carbon black from the tail gas, utilizing said tail gas either before or after carbon black recovery to provide the elevated temperature for the reforming of the hydrocarbon fuel.

Preferably, at least a portion of the tail gas after carbon black recovery is combusted with an oxidant gas to produce the elevated temperature for the reformation of the hydrocarbon fuel.

Alternatively, the tail gas after quench provides the elevated temperature for the reformation of the hydrocarbon fuel by indirect heat exchange.

Optionally, carbon dioxide is added to the elevated temperature reformation reaction.

DETAILED DESCRIPTION OF THE DRAWINGS

DETAILED DESCRIPTION OF THE INVENTION

Figure 1:
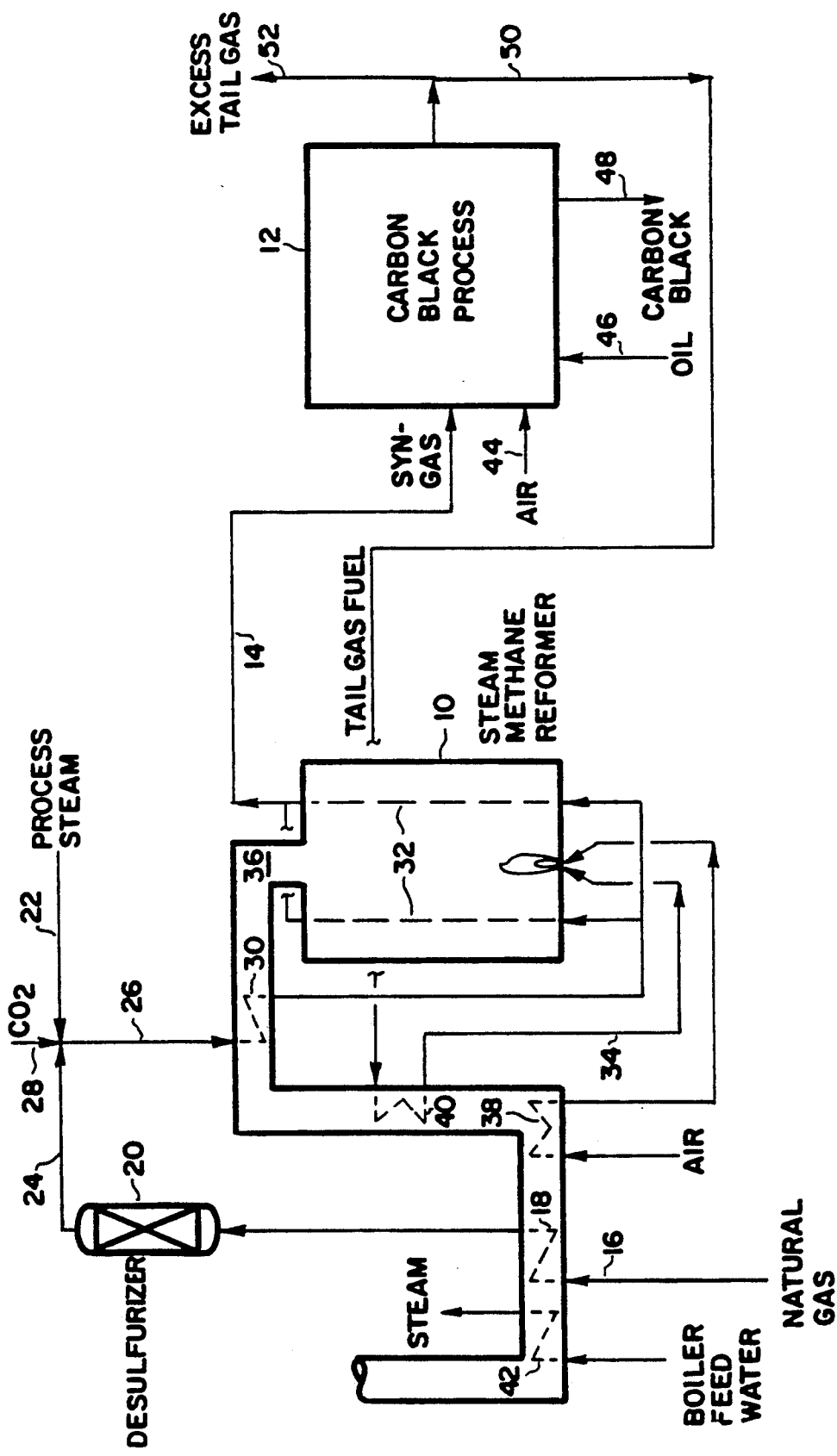
FIG. 1 is a schematic illustration of a first preferred embodiment of the present invention.

The proposed invention in FIG. 1 integrates a steam-methane reformer (SMR) 10 with the carbon black process 12 to improve overall energy efficiency. The SMR utilizes waste energy from the carbon black process by producing synthesis gas 14, containing $H_2$ and CO, from natural gas 16 and steam 22 ($CH_4 + H_2O \rightarrow 3H_2 + CO$). The synthesis gas replaces natural gas fuel for the carbon black reactor 12 and its upgraded heating value allows for overall reduction of natural gas consumption or an increase in carbon black production.

FIG. 1 illustrates one embodiment of the SMR/Carbon Black integrated process. Natural gas 16, as a hydrocarbon fuel containing mostly methane and some $N_2$, $CO_2$, $C_{+2}$, is heated 18 to about 750° F., and trace $H_2S$ is removed using a solid adsorbent of typically ZnO in vessel 20. Process steam 22 is mixed with the natural gas 24 resulting in a mixed feed 26 with a steam/carbon ratio of 1.0–3.5 (typically 1.5). Carbon dioxide 28, if available, can also be mixed into the feed from 0.1 to 2.0 $CO_2/C$ ratios. The mixed feed (steam and natural gas) is heated in the convection section coil 30 to 900°–1050° F. and enters a steam-methane reformer (SMR) 10. In the SMR, the mixed feed passes through tubes 32 with a Ni containing catalyst. such as 5–30% Ni on an alumina support, which promotes the reaction of methane and steam to produce hydrogen and carbon monoxide (reforming reaction). The water gas reaction ($CO + H_2O \rightarrow CO_2 + H_2$) also occurs to yield a synthesis gas containing hydrogen, carbon monoxide, carbon dioxide, water and small amounts of unreacted methane. The synthesis gas 14 exits the SMR at 1300°–1700° F. and is sent to the carbon black reactor 12 for fuel.

The heat input for the reforming reactions is provided by burning the hot (about 500°–1100° F.) carbon black process excess tail gas 34 (50–150 BTU/SCF) Higher Heating Value (HHV) in the furnace 10 containing the reformer tubes 32. Optionally, the tail gas can be cooled, separating condensed water, and improving its heating value to the SMR furnace. Hot flue gas 36 (about 1700°–2000° F.) from the furnace section is used to preheat reformer mix feed 30, optionally preheat fuel 40 and combustion air 38 to 500°–1500° F., preheat natural gas feed 18 and raise sufficient steam 42 for the reforming reaction and excess steam for export, if economical.

The carbon black process combusts the synthesis gas 14 with preheated air or other oxidant gas 44 (800°–1400° F.) in the furnace section of the reactor 12. Combustion air or other oxidant gas from stoichiometric to a large excess (100–200%) is used to produce a hot combustion gas (2300°–3400° F.). Oil feed 46, as a hydrocarbon feedstock, is sprayed into the hot gas and pyrolyzed to carbon black product. Excess oxygen in the combustion gas partially oxidizes the oil feedstock producing a tail gas containing principally $N_2$, $H_2$, CO, $CO_2$ and $H_2O$. The tail gas is quenched and cooled. The carbon black product 48 is then filtered from the tail gas, and a portion is sent to the SMR for fuel. Excess tail gas 52 can be removed from the process.

Figure 2:
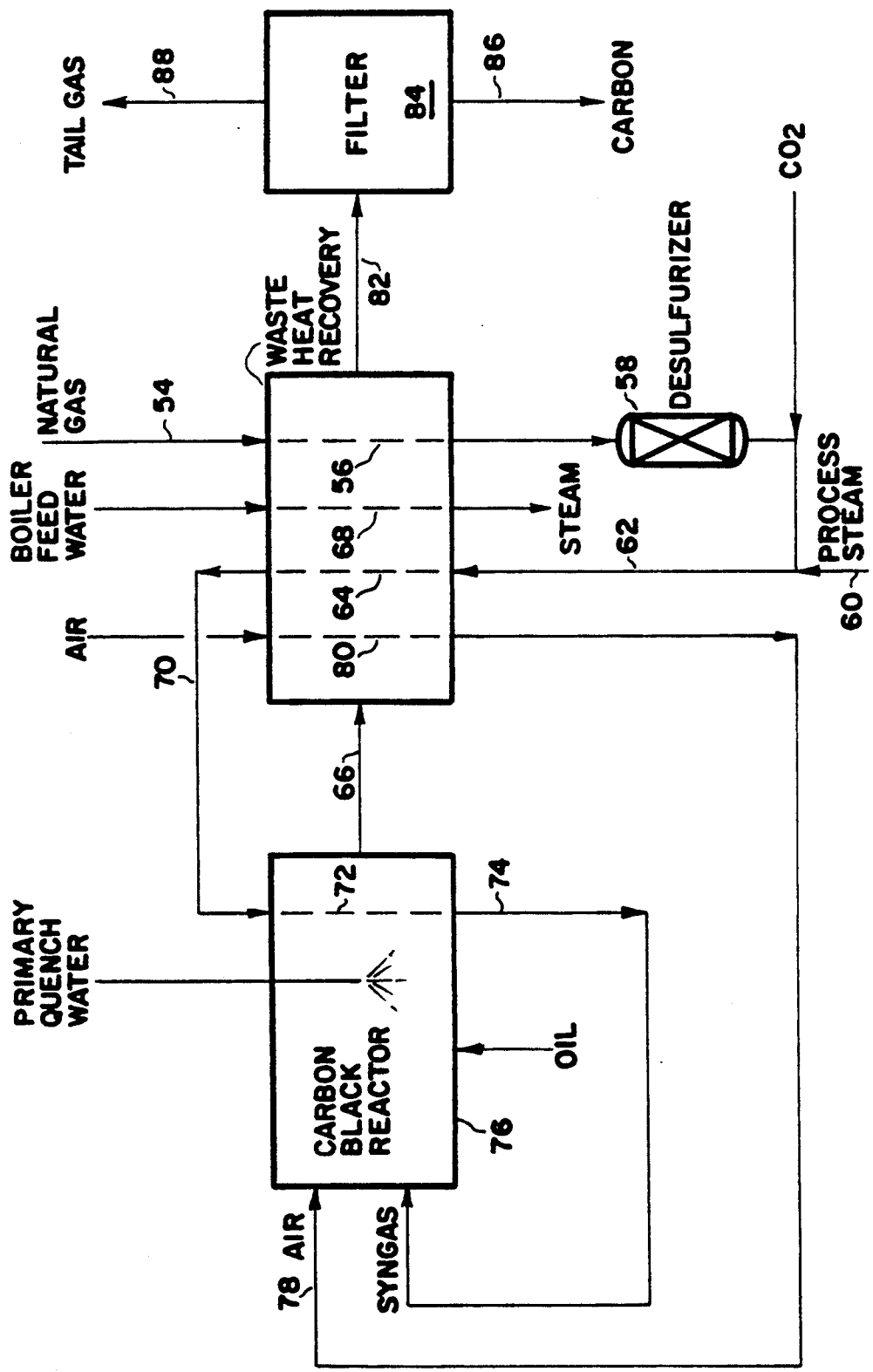
FIG. 2 is a schematic illustration of a second embodiment of the present invention.

FIG. 2 is another embodiment of the proposed invention. Natural gas 54 is preheated 56 to about 750° F. against hot carbon black reactor effluent gas 66 and desulfurized 58. Steam 60 is added and the mixed feed 62 is, optionally, preheated 64, also against hot effluent gas 66. Steam is either provided external from the process or also raised 68 from the effluent gas. The mixed feed 70 enters tubes 72 containing a Ni catalyst where steam-methane reforming is accomplished. The resulting synthesis gas 74 is used to fuel the carbon black reactor 76 along with air or oxidant gas 78 which may be preheated 80 against effluent gas 66. The heat for the reforming reaction 72 is provided by convective heat transfer from the carbon black pyrolysis hot reactor effluent, post primary quench at about 2000° F.

Carbon black containing tail gas 82 is passed through a filter 84 to recover carbon black 86 and an effluent tailgas 88.

The integrated SMR/Carbon black process utilizes waste energy from the carbon black process to reform natural gas into synthesis gas with an upgraded heating valve. This synthesis gas fuels the carbon black reactor and effectively transfers that waste energy back to the carbon black reactor. This integrated effect improves overall process efficiency and can reduce natural gas consumption or improve carbon black production. The waste energy used for reforming is either from the excess low BTU value tail gas or the hot reactor effluent gas, post primary quench.

Several advantages are offered over conventional carbon black production:

1. Natural gas savings or increased carbon production are achieved cost effectively. Capital investment for the SMR has an expected attractive payback. No retrofit changes are required to the carbon black process.

2. Carbon black fuel containing CO and $CO_2$ can improve carbon black yield, further improving the overall economics. A carbon production increase of 40% can be achieved with 1:1 $H_2$/CO fuel.

3. Excess steam generated by the SMR process (embodiment #1) can further reduce natural gas consumption for steam furnaces or be used to cogenerate electricity.

4. Reactor effluent waste heat (embodiment #2) used for reforming reduces direct quench requirements. Limiting water addition to the reactor effluent improves carbon yields.

The conventional carbon black process requires about 47 thousand standard cubic feet per hour (MSCFH) natural gas fuel to produce 154 thousand pounds per day (MLB/DAY) carbon. The integrated SMF process of the present invention requires only 32 MSCFH natural gas which constitutes a 32.5% energy savings. Alternatively, plant production can be increased to about 190 MLB/DAY. If a 10% carbon yield increase is realized, production can increase to 258 MLB/DAY.

The present invention has been set forth with regard to several preferred embodiments, however, the full scope of the present invention should be ascertained from the claims which follow.

What is claimed is:

1. A process for the production of carbon black from a hydrocarbon feedstock comprising:
    (a) reforming a hydrocarbon fuel into a predominantly hydrogen and carbon monoxide containing synthesis gas with steam in a catalytic elevated temperature reformation reaction;
    (b) pyrolyzing and partially oxidizing said hydrocarbon feedstock in the presence of the combustion of said synthesis gas and an oxidant gas to produce a carbon black containing tailgas wherein the heat of pyrolysis is provided by the combustion of said synthesis gas;
    (c) quenching said tailgas and recovering said carbon black from said tailgas;
    (d) utilizing tailgas after carbon black recovery to provide said elevated temperature for the reforming of said hydrocarbon fuel wherein at least a portion of said tailgas after carbon black recovery is combusted with a second oxidant gas to produce said elevated temperature.

2. The process of claim 1 wherein carbon dioxide is added to said elevated temperature reformation reaction.

* * * * *